June 29, 1965  J. R. TIMBERLAKE  3,191,755
BALE THROWER
Filed Nov. 21, 1961  3 Sheets-Sheet 1

Inventors.
John R. Timberlake
Paul O. Pippel Atty.

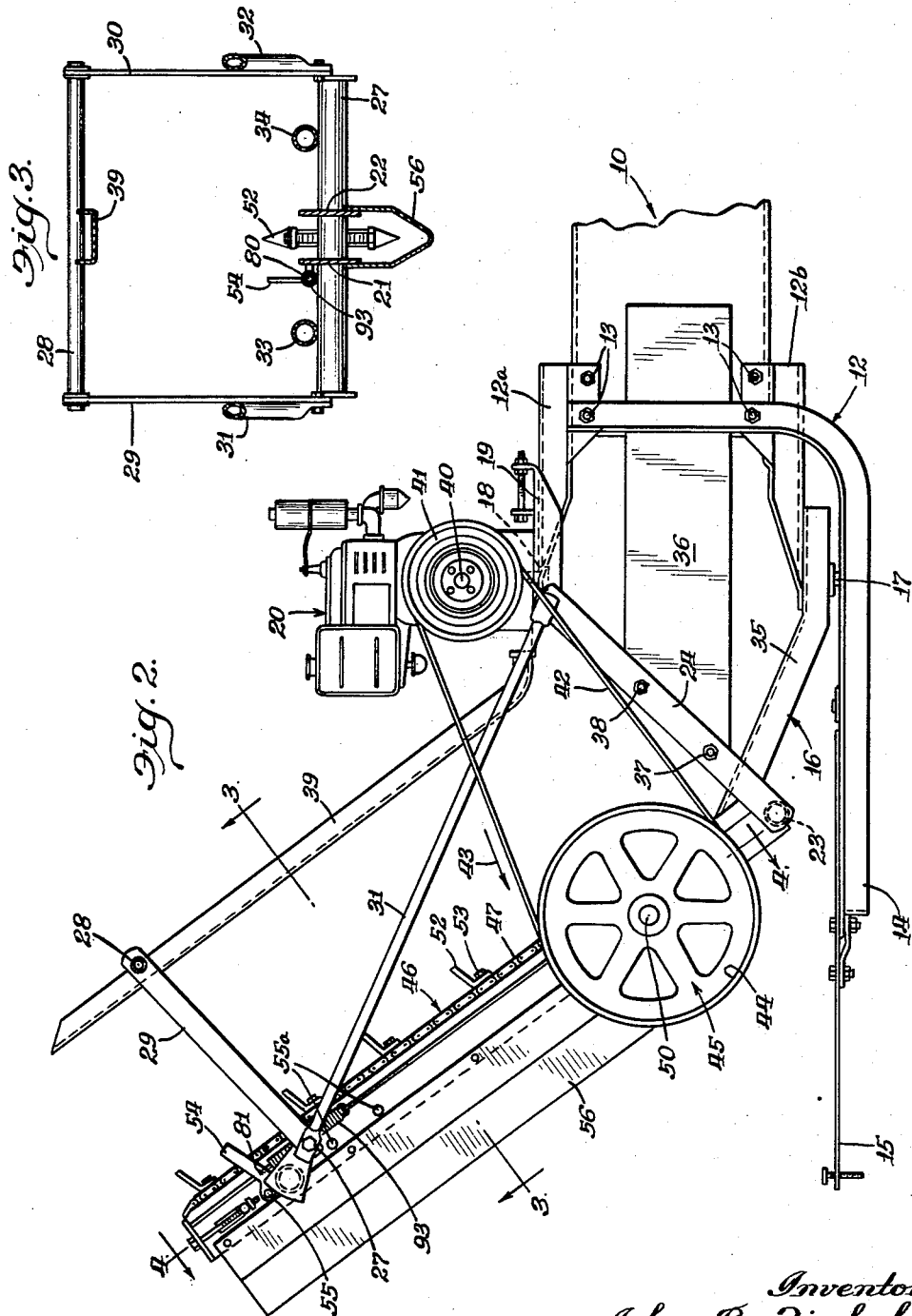

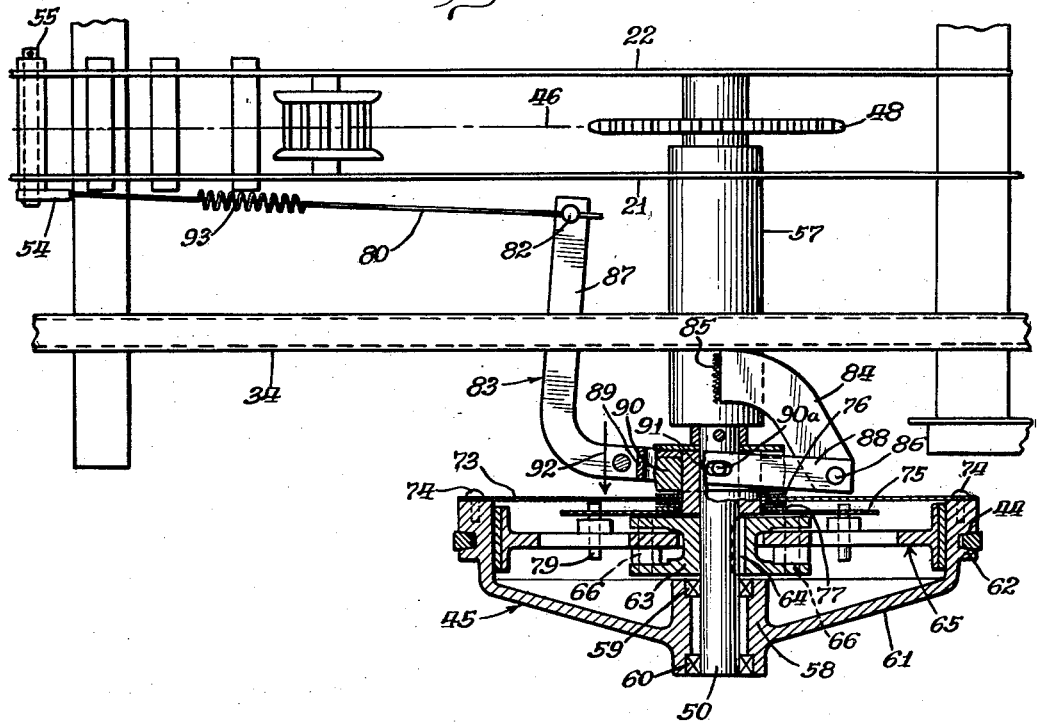
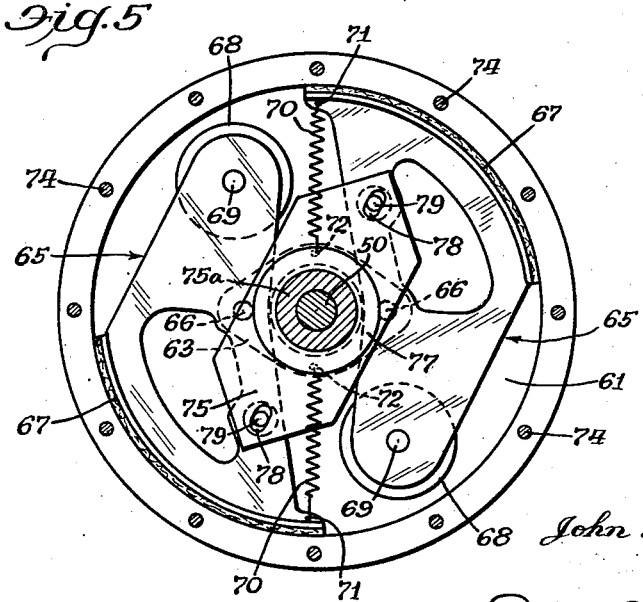

United States Patent Office 3,191,755
Patented June 29, 1965

3,191,755
BALE THROWER
John R. Timberlake, Downers Grove, Ill., assignor to International Harvester Company, Chicago, Ill., a corporation of New Jersey
Filed Nov. 21, 1961, Ser. No. 153,900
7 Claims. (Cl. 198—128)

This invention relates to a new and improved bale thrower.

With the advent of one-man automatically operated hay balers there has remained the problem of gathering completed hay bales from the field either at a later time or at the time of baling. Both of these gathering projects have usually involved a sliding of bales of hay up to the deck of a trailing wagon at which time additional manpower is necessary to stack the bales. Very recently means have been provided on or adjacent to hay balers for throwing or pitching the completed bales to a rearwardly spaced trailing wagon. It is with this type of device that the present invention is concerned.

A principal object of the present invention is to provide a mechanism for pitching completed bales of hay from a baler to a trailing wagon.

An important object of this invention is to provide an inclined structure at the discharge end of a bale forming chamber to throw the bale upwardly and rearwardly for deposit in a trailing wagon.

Another important object of this invention is to provide a bale ejector in which the bale driving means is operable only during the brief period of bale pitching and is inactive and "freewheeling" during the period of time when the succeeding bale is being delivered to the pitching platform.

Still another important object of this invention is to equip a bale ejector with an upwardly and rearwardly inclined supporting structure forming an inclined bale receiving ramp and having a pitching conveyor mounted on the bottom thereof which is operably driven in response to a positioning of a bale on the inclined platform.

Another and still further important object of this invention is to provide a bale pitcher having a centrally disposed upwardly and rearwardly inclined endless chain with bale engaging fingers positioned therealong and arranged to be intermittently driven to thereby cause a bale in engagement with the chain fingers to be thrown upwardly and rearwardly.

Still another important object of this invention is the provision of clutch actuating means located at the upper rearward end of an upwardly and rearwardly inclined bale receiving ramp so that drive to the bale pitching mechanism is effected only after the bale to be pitched has been fully positioned on the inclined platform.

Another important object of this invention is to provide a bale pitcher which includes a clutch actuating trip finger projecting up into the path of movement of a bale to be pitched and further including an overtravel spring means between the trip finger and the clutch to thereby permit removal of the trip finger as an obstruction to movement of the bale after the clutch has been actuated.

Another and still further important object of this invention is the provision of means for adjustably positioning a trip finger to enable a bale pitching device to efficiently pitch various lengths of bales.

Other and further important objects and advantages of this invention will become apparent from the disclosures in the following specification and accompanying drawings.

FIGURE 2 is a side elevational view of the device as shown in FIGURE 1.

FIGURE 3 is a sectional view taken on the line 3—3 of FIGURE 2.

FIGURE 4 is a sectional view taken on the line 4—4 of FIGURE 2 showing a cut-away view of the clutch and its operating mechanism.

FIGURE 5 is an elevational view of the clutch with the covering removed to show the interior construction.

As shown in the drawings:

Figure 1:
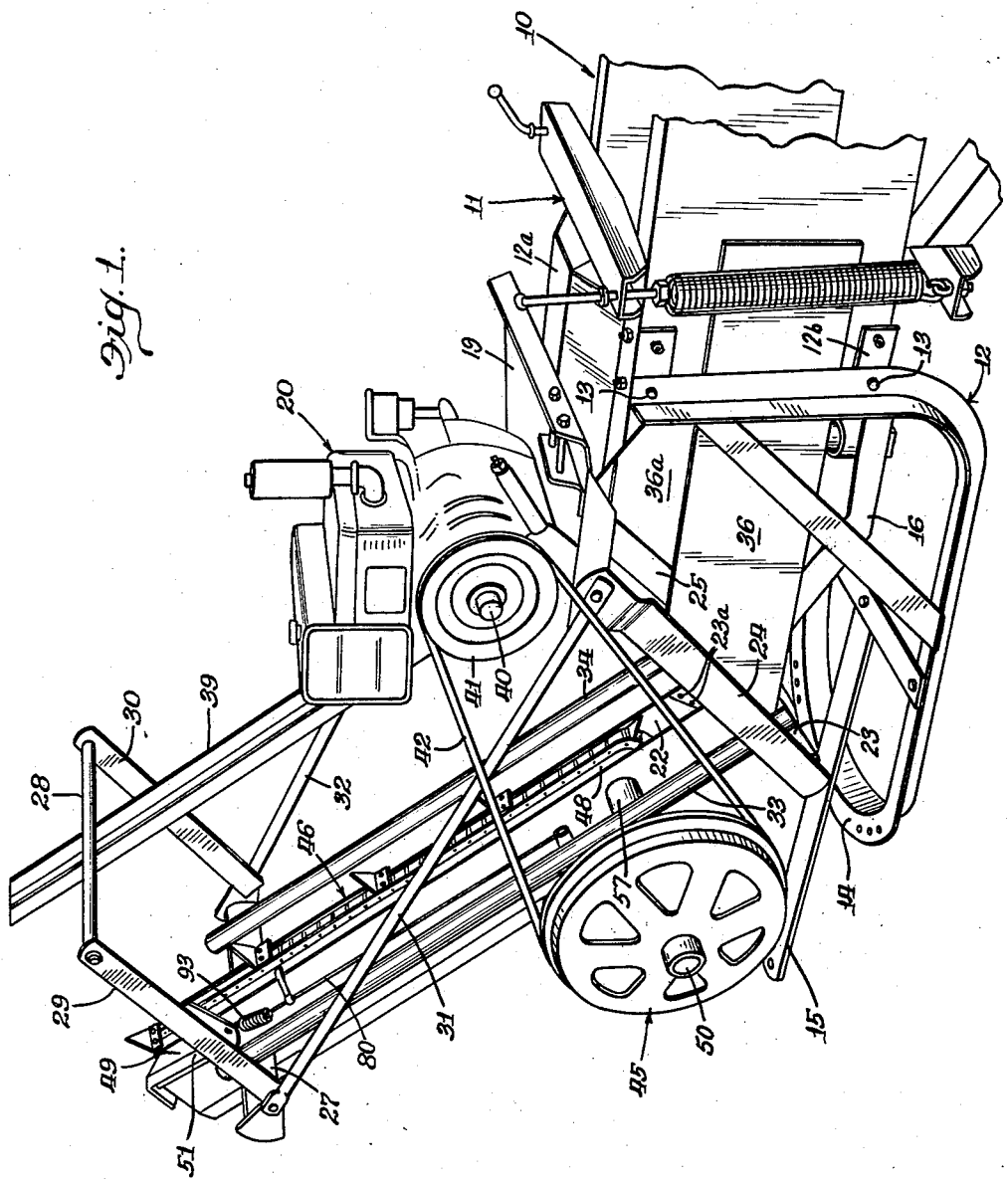
FIGURE 1 is a perspective view of the bale ejector of this invention mounted on the rear of a hay baler.

The reference numeral 10 indicates generally the rearward discharge end of a bale forming chamber. Means 11 is provided to adjust the tension on the discharge end of the bale forming chamber. The detail construction of the bale forming chamber 10 or the tensioning means 11 has not been shown or described further inasmuch as it forms no part of the present invention but is merely shown to indicate environment for the bale ejector. A frame structure 12 for the purpose of reinforcing the bale-forming chamber 10 is fastened by bolts 13 to the rearward end of the bale forming chamber 10. The frame structure 12 includes a top attaching bracket 12a, a bottom attaching bracket 12b, and a rear bail-like extension 14 having a hitch member 15 pivotally mounted with respect thereto to provide means for attaching a trailing wagon or the like. The bale ejector of this invention is mounted on and carried by the frame structure 12.

The bale ejector is equipped with a lower supporting structure 16 which as shown in FIGURE 2 is pivotally mounted on a hinge 17 on the lower attaching bracket 12b of the frame support 12. A similar hinge 18 is provided on the topside of the bale forming chamber 10 to thus carry an upper supporting structure 19 in a pivotal relationship with the top attaching bracket 12a of the stationary frame structure 12. The hinge pins 17 and 18 are in vertical axial alignment so that the bale ejector may pivotally move in any desired angular position relative to the discharging bale forming chamber 10.

The upper supporting structure 19 constitutes a plate-like ledge or deck for carrying an engine 20. The engine 20 is adapted to impart drive to the bale ejector mechanism of this invention.

The bale ejector supporting structure includes upwardly and rearwardly extending spaced apart plate members 21 and 22. The lower ends of these plates are carried by a transversely disposed tubular supporting member 23 and are fastened as shown at 23a to the lower supporting structure 16. The sides of the tube 23 are provided with upwardly inclined arm members 24 and 25. The upper ends of the inclined arms 24 and 25 are fastened directly to the upper support 19. The elements 23, 24, 19 and 25 define a rectangular opening through which a bale formed in the bale forming chamber 10 may pass for positioning on the upwardly and rearwardly inclined bale ejector deck or discharge ramp 33 and 34. The upper end of the ramp is provided with a similar rectangular opening defined by a lower cross tube 27 and an upwardly spaced parallel top cross tube 28 which are joined by generally upwardly projecting side arms 29 and 30. Diagonal brace members 31 and 32 extend respectively from the upper end of the inclined arm 24 to the lower end of the rearwardly disposed side frame member 29 and the upper end of the inclined arm 25 to the lower end of the rearwardly disposed side arm member 30. The inclined ramp or deck in addition to including the upwardly and rearwardly extending spaced apart plate members 21 and 22 also includes spaced apart upwardly and rearwardly extending tubular members 33 and 34 which flank the sides of the spaced plates 21 and 22. Thus the smooth surfaced tubular members 33 and 34 provide the upwardly and rearwardly inclined deck upon which the completed bales are slid preliminary to ejection therefrom for deposit into a trailing wagon or the like.

The supporting structure 16 located adjacent the bale forming chamber includes a centrally disposed member 35 which constitutes a rearward continuation of the bale forming chamber 10. It is this member 35 that is supported by the hinge pin 17 and provides intermediate support for the discharging bales coming from the bale forming chamber 10 for guidance to the inclined deck which includes the spaced tubular members 33 and 34. The sides of the bales are guided on one side by a flexible sheet member 36 which as shown in FIGURE 2 is fastened to the inclined side member 24 by bolts or the like 37 and 38. A similar flexible sheet member 36a is provided in conjunction with the spaced apart inclined side member 25. The plates 36 and 36a are guided at their forward ends by sliding engagement in the slight space left between the side walls of the bale forming chamber 10 and the frame structure 12. Thus as the bale ejector is adjustably positioned about its vertical hinges 17 and 18 the side sheet members 36 and 36a flex to conform to the particular angular adjustment. There is sufficient clearance provided between a portion of the frame structure 12 and the side of the bale forming chamber 10 to permit this described sliding movement of the ends of the flexible sheet members 36.

The top of the inclined bale ejector is equipped with a channel-shaped guide member 39 which is fastened at its upper rearward end to the cross member 28. The lower forward end of the channel 39 is curved downwardly and forwardly for fastening to the rearward end of the upper support 19 on which the engine 20 is carried. There is thus provided a confined, upwardly and rearwardly inclined chamber or platform for guiding completed bales of hay preliminary to these bales being propelled upwardly and rearwardly for deposit in a trailing wagon.

As shown in FIGURES 1 and 2 the engine 20 is provided with a driven shaft 40 on which is mounted a V-pulley 41. The V-pulley 41 is engaged by a V-belt 42 which is driven in the direction of the arrow 43 as shown in FIGURE 2. The V-belt 42 is adapted to engage a V-pulley groove 44 in the outer periphery of a drum member 45. This constantly driven drum member 45 forms the driving part of an intermittently operable clutch for effecting the pitching or discharging of bales at desired intervals.

A bale engaging conveyor or drive means 46 is carried between the spaced plates 21 and 22 constituting a part of the base of the inclined deck from which the bales are pitched. It should be understood that the conveyor means 46 shown herein is a preferred embodiment, yet it is not intended to limit the combination of elements to the particular conveyor means shown. The conveyor 46 includes an endless chain 47 mounted on spaced apart sprockets 48 and 49. The sprocket 48 is mounted on a shaft 50 which journally carries the drum member 45. The upper rearwardly positioned sprocket 49 is mounted on a stub shaft 51 carried between the spaced plates 21 and 22. The conveyor 46 free-wheels until such time as it is driven from the engine 20 as hereafter to be described. Spike toothed fingers 52 are fixedly attached by means of bolts or the like 53 at regular intervals around the endless chain 47. These outwardly projecting fingers 52 are adapted to engage and penetrate the surface of the completed bales as they are pushed onto the upwardly and rearwardly inclined deck by reason of a continuing formation of bales of hay in the bale forming chamber 10. The impetus for moving the bales in position onto the inclined deck is thus obtained, not by any external drive means, but rather by the formation of succeeding bales in the bale forming chamber to thereupon drive out the previously made bales. This enables the ejector to be used for bales of various lengths. The trip finger is hinged in a selected socket 55a that will insure engagement of said trip finger by the bale before the preceding bale is overlying drive means 46.

In the device of this invention a completed bale is moved rearwardly over the lower base member 35 and then up onto the deck defined by the top surfaces of the spaced apart tubular members 33 and 34 and the spaced apart plate members 21 and 22. The conveyor means 46 is adapted to "freewheel" or in other words move freely with movement of the bale without dragging any large drive element. Further the conveyor 46 is not being driven while the bale is moving into position on the inclined deck from which it will be propelled. Thus as the bale moves onto the inclined surface the spike toothed fingers 52 penetrate the bottom surface of the dense bale of hay. The fingers are disposed at frequent intervals along the length of the bale to make positive engagement or interengagement between the conveyor means 46 and the bale to be thrown.

As will later be described it is the attaining of a predetermined position of the bale on the inclined deck that actuates the clutch to impart drive to the conveyor means 46 from the engine 20. An actuating finger or lever 54 is provided near the upper rearward end of the deck to be engaged by an oncoming bale. The bale causes the finger 54 to be swung about its hinge 55 to thereupon cause the intermittently operable clutch to effect operation of the conveyor means. The specific connecting means between the trip finger 54 and the clutch will be described in detail later. The position of the trip finger may be adjustably hinged in any one of the spaced apart hinge sockets 55a which are fixedly mounted on the plates 21 and 22.

As shown in FIGURES 2 and 3 the lower run of the endless conveyor means 46 is shielded by a U-shaped housing 56. This U-shaped housing 56 forms a downward continuation around the conveyor 46 and has its sides joined to the spaced plates 21 and 22.

As best shown in FIGURE 4 the shaft 50 is journally mounted within a stationary tube or sleeve 57 which is supported by the bottom members 21 and 33 of the bale ejector. The drum member 45 is provided with a hub 58 which is journally mounted on spaced bearings 59 and 60 over the outer end of the shaft 50. Thus drive may be continuously imparted to the drum member 45 through engagement of the belt 42 with the V-pulley 44 without directly imparting rotational drive to the shaft 50. The drum member 45 is equipped with a generally radially disposed, outwardly projecting flange or spider 61 and an axially extending flange or rim 62 on which the V-pulley groove 44 is formed. The rim 62 gives the member 45 its drum shape from which it is identified. The inner surface of the rim 62 acts as an annular friction surface to effect actuation of the clutch which will be hereinafter described in detail.

A hub 63 is attached by means of a pin or the like 64 to the shaft 50. Thus the hub 63 moves and rotates with the shaft 50. An arm 65 is pivotally attached intermediate its ends at 66 on the hub 63. One end of the arm 65 is provided with an arcuate clutch shoe 67. The clutch shoe 67 is normally positioned closely adjacent to the internal surface of the rim 62 of the driven drum member 45. The other end of the arm 65 constitutes a counterweight 18. As shown herein counterweights 68 are carried on and about a center 69. The hub 58 of the drum member is axially offset from the rim 62 so that the hub 63 may be disposed in planar alignment with the rim 62. A spring 70 having one end fastened at 71 to the end of the clutch shoe 67 and its other end fastened at 72 to the hub 63 normally urges the clutch shoe away from engagement with the inner surface of the rim 62. An outward movement of the clutch shoe 67 against the action of the spring 70 causes the clutch shoe 67 to frictionally engage the drum 45 and thereby carry drive from the drum down to the arm 65 and through the hub 63 to the shaft 50. Thus hub 63, arms 65, clutch shoes 67, counterweights 68 and springs 70 form the driven parts of the clutch. The sprocket 48 is mounted on this shaft 50 so that drive from the engine 20 to the bale thrower conveyor 46 is completed when the clutch is engaged.

The means for effecting an outward movement of the clutch shoe end of the arms 65 includes a radially, inwardly projecting, flexible sheet metal skirt 73 (see FIG. 4) which is fastened by means of screws or the like 74 to the rim 62. The clutch acuator means further includes a plate 75 which is journally mounted over the shaft 59 at a position adjacent to the hub 63. The plate 75 is not fastened to the shaft 59 but is merely journalled thereon. The plate 75 may be termed a self-locking clutch actuator. Annular friction surfaces 76 and 77 are provided on the skirt 73 and plate 75 respectively. There is normally a slight space between these cooperating friction faces 76 and 77 whereby drive from one to the other is prevented. It should be understood that as the drum member 45 continuously rotates so does the annular friction face 76 on the flexible skirt 73. The plate 75 is normally stationary and thus when axial movement is applied to the flexible skirt 73 the friction faces 76 and 77 engage to rotate plate 75. As shown in FIGURE 5 the plate 75 is provided with a generally radially disposed elongated slot 78. A pin 79 carried by the arm 65 at a position between the brake shoe 67 and the pivot 66 loosely engages the elongated slot 78. Now, when rotational drive is imparted to the plate 75 it imparts a corresponding initial rotation to the arm 65. This initial rotation of the arm 65 through the medium of the plate 75 engaging the arm by the pin 79 causes an initial outward movement of the clutch shoe 67 about its hinge 66 thereupon causing the clutch shoe 67 to engage the inner annular surface of the drum rim 62 to thereupon provide for the rotation of all of the elements as a unit with the driven drum member. Of course the imposing of the great load of a bale on the conveyor unit 46 causes an initial drag on the drum or flywheel member 45 which causes its r.p.m. to materially drop. However, the speed of rotation picks up almost instantaneously after the bale on the inclined patform has been thrown upwardly and rearwardly for deposit in a trailing wagon. It is this pickup in speed that now acts to halt the operation of the device by reason of the counterweights 68 being thrown outwardly by centrifugal force. The centrifugal force is created by rotation of the unit at an increasing speed causing the weights 68 to swing outwardly about the arm pivot 66 thus drawing the clutch shoe 67 away from the drum member 45. It should be understood that immediately after the conveyor has been used to pitch a bale of hay, the clutch is automatically disengaged, returning the device to an inactive state where delivery of a succeeding bale to a position on the inclined platform may be made without any tearing or mangling of the bale such as might have been caused by a continuously rotating member with spike teeth or the like.

Deflection of the flexible skirt 73 to initially impart rotation to the sef-locking clutch actuator 75 is accomplished by the positioning of a bale on the inclined tubular members 33 and 34. The upper end of the bale moves the actuator finger 54 causing it to be deflected upwardly and rearwardly thereupon pulling a cable or the like 86 upwardly and rearwardly. The cable 80 is fastened at one end at 81 to the arm 54 and as shown in FIGURE 4 the other end of the cable 80 is fastened at 82 to a bellcrank lever 83. An arm member 84 is welded or otherwise fastened at 85 to the sleeve support 57. The bellcrank 83 is pivoted at 86 to the outer end of the arm 84. The bellcrank 83 includes a generally transversely disposed arm 87 and a generally longitudinally extending arm 88 disposed at right angles thereto. The hinge 86 of the bellcrank is located near the end of the arm 88. The center of the arm 88 is provided with a bifurcated portion 89 for the purpose of snugly engaging the sides of an axially shiftable member 90 which is journally slidable on an annular hub 75a of the plate 75. Diametrically disposed stub pins 90a project radially outwardly from the shiftable member 90 to engage elongated slots 91 in the bifurcated portion 89 of the arm 88. Thus when the finger or trip arm 54 is moved about its hinge 55 by reason of a bale striking it, the bellcrank lever 83 is pulled causing the arm 88 thereof to move inwardly in the direction of the arrow 92. The member 90 causes the skirt 73 to flex and moves it inwardly for effecting engagement of the mating friction surfaces 76 and 77 to start operation of the clutch 40. A spring 93 forms a part of the cable 80 thus permitting the trip arm 54 to be immediately swung completely down beneath the surface of the tubular deck members 33 and 34. Upward and rearward movement of the bale of hay being pitched is not impaired by the trip finger 54. The bale itself just pushes the trip lever 54 against the action of the overtravel spring and moves the trip down out of the way.

In the operation of the device of this invention the hay baler upon which the ejector is mounted traverses a field of windrowed hay, packs the hay into a bale forming chamber 10 and ties the hay into separate bales of a desired length. The bale ejector mounted on the rear of the forming chamber 10 receives a completed bale by reason of the continuous movement of hay into the forward end of the bale forming chamber. Thus it is the movement of hay bales by their formation that causes the bale to be placed into pitching position on the inclined deck comprising the floor members 33 and 34. The spike toothed fingers 52 of the conveyor means 46 engage the surface of the bale as it is moved into pitching position. When the bale is on the inclined deck the upper end thereof will engage the actuating finger 54 causing the clutch to operate and impart drive to the conveyor means 46 from the engine 20. Immediately following the pitching of the bale upwardly and rearwardly by the sudden imparting of energy to the bale by the conveyor means 46, there results a simultaneous deenergizing of the clutch and a quick halting of operation of the conveyor means 46. The inclined deck is now free to receive succeeding bales as they are formed in the bale forming chamber 10 without the conveyor means 46 being driven until such time as the succeeding bale strikes the actuator finger 54 and causes that bale to be pitched or ejected upwardly and rearwardly for deposit into a trailing wagon or the like. It should be understood that the conveyor means 46 instead of having a sprocket and chain could be any moving surface such as an endless flexible member or a rotating member and that the sprockets could be rollers. Thus these other terms are used herein to indicate that the conveyor may be any one of a number of types.

I am aware that various details of construction may be varied throughout a wide range without departing from the principles disclosed herein and I therefore do not propose limiting the patent granted hereon otherwise than as necessitated by the appended claims.

What is claimed is:

1. A bale thrower for hay bales being delivered from a bale forming machine, comprising: a supporting structure for attachment on said bale forming machine adjacent the bale discharge thereof, a first rotary member mounted for free-wheeling on one end of said supporting structure, a second rotary member mounted for free-wheeling and above said first rotary member on the other end of said supporting structure, an endless member trained around said first and second rotary members, bale engaging means on said endless member, an inclined ramp mounted on said supporting structure in bale-supporting relation with a run of said endless member, a bale sensing means mounted along the path of said endless member, drive means connected to one of said free-wheeling rotary members, power supply means for driving said drive means, a first means for connecting said power supply means to said drive means for accelerative movement of said endless member, said first connecting means normally being in a non-connected position, second connecting means between said sensing means and said first connecting means, said second connecting means being actuated by said bale sensing means in response to the presence of a bale of hay in ejecting position on said ramp to operate said first connecting means to connect said drive and power supply means.

2. A bale thrower as recited in claim 1, wherein: said free-wheeling rotary members are sprockets and said endless member is a continuous chain having bale-engaging fingers located at intervals therealong.

3. A bale thrower as recited in claim 2, wherein: bale guide means for engaging each bale and holding each said bale in sliding contact with said ramp is located on said support structure spaced from said ramp a distance substantially equal to the thickness of a bale of hay.

4. A bale thrower as recited in claim 1, wherein: said first means for connecting said power supply means to said drive means is a clutch assembly normally in a disengaged position, and said second connecting means joins said sensing means and said clutch assembly.

5. A bale thrower as recited in claim 1, wherein: said bale sensing means includes a lever, means adjustably mounting said lever on said suport structure for accommodation of various lengths of bales, said lever including a portion projecting into the path of bale travel along said ramp.

6. A bale thrower as recited in claim 1, wherein, bale guide means for engaging each bale and holding each said bale in sliding contact with said ramp is located on said support structure spaced from said ramp a distance substantially equal to the thickness of a bale of hay.

7. A bale thrower for hay bales being delivered from a bale forming machine, comprising: a supporting structure for attachment on said bale forming machine adjacent the bale discharge thereof, orbiting bale supporting and trajecting means mounted for free-wheeling on said supporting structure, bale engaging means on said orbiting means for transmitting bale ejecting forces to the bales engaged thereby, means mounted on said supporting structure in bale-supporting relation with said orbiting means, a bale sensing means mounted along the path of said orbiting means and responsive to the movement of a bale thereon, drive means connected to said free-wheeling orbiting means, power supply means for driving said drive means, a first means for connecting said power supply means to said drive means for accelerative movement of said orbiting means, said first connecting means normally being in a non-connected position, second connecting means between said sensing means and said first connecting means, said second connecting means being actuated by said bale sensing means in response to the presence of a bale of hay in ejecting position on said orbiting means to operate said first connecting means to connect said drive and power supply means.

References Cited by the Examiner
UNITED STATES PATENTS

| | | | |
|---|---|---|---|
| 2,151,150 | 3/39 | Pohlmeyer | 192—78 |
| 2,518,083 | 8/50 | Sims. | |
| 2,613,591 | 10/52 | Bruns | 214—42 |
| 2,812,052 | 11/57 | Doyer | 198—128 |
| 2,827,154 | 3/58 | Forth et al. | 198—128 |
| 2,859,847 | 11/58 | Kuehn | 192—93 |
| 2,988,201 | 6/61 | Ludwig | 198—128 |
| 3,055,519 | 9/62 | Hollyday | 198—128 |
| 3,074,536 | 1/63 | Lance | 198—204 |

SAMUEL F. COLEMAN, *Primary Examiner.*
WILLIAM B. LA BORDE, ERNEST A. FALLER,
*Examiners.*